United States Patent
Macy et al.

(10) Patent No.: US 12,051,119 B1
(45) Date of Patent: *Jul. 30, 2024

(54) BATCH PROCESSING COMPOSITION AND CONVERSION

(71) Applicant: Universal Air Travel Plan, Inc.

(72) Inventors: Jonathan Patrick Macy, College Park, MD (US); Dawn Helene Maughan, Shoreline, WA (US)

(73) Assignee: UNIVERSAL AIR TRAVEL PLAN, INC., Washington, DC (US)

( * ) Notice: Subject to any disclaimer, the term of this patent is extended or adjusted under 35 U.S.C. 154(b) by 519 days.

This patent is subject to a terminal disclaimer.

(21) Appl. No.: 17/225,305

(22) Filed: Apr. 8, 2021

Related U.S. Application Data

(63) Continuation of application No. 14/810,250, filed on Jul. 27, 2015, now Pat. No. 10,977,742.

(51) Int. Cl.
*G06Q 20/22* (2012.01)
*G06Q 40/12* (2023.01)

(52) U.S. Cl.
CPC .................... *G06Q 40/12* (2013.12)

(58) Field of Classification Search
CPC ..................................... G06Q 40/12
USPC ........................................... 705/30
See application file for complete search history.

(56) References Cited

U.S. PATENT DOCUMENTS

| | | | |
|---|---|---|---|
| 7,693,783 B2 | 4/2010 | Balasubramanian | |
| 8,676,698 B2 | 3/2014 | Sung | |
| 8,799,089 B1 | 8/2014 | Gonzalez Loyo | |
| 2003/0183689 A1 | 10/2003 | Swift | |
| 2012/0095873 A1* | 4/2012 | Narang | G06Q 30/0613 705/26.41 |
| 2012/0253852 A1 | 10/2012 | Pourfallah | |
| 2013/0211934 A1* | 8/2013 | Balasubramanian | G06Q 30/04 705/16 |
| 2016/0328802 A1 | 11/2016 | Howe | |

* cited by examiner

*Primary Examiner* — Luna Champagne
(74) *Attorney, Agent, or Firm* — GRASSO PLLC

(57) ABSTRACT

Systems and processes may promote simplified and customized reconciliation of an entire period of time's transactions by a merchant computing system through the use of PSS batching techniques and related reporting. In embodiments, a merchant computing system may be able to reconcile an entire day of sales in a single received line item based on the merchant's single day total for a certain alternate form of payment provider. Embodiments employing the batching and reporting techniques can promote simplification and enhanced processing at a merchant computing system through avoidance of individual reconciliation of alternate forms of payment transactions and by reconciliation over a time-period range set by a merchant or set by an alternate form of payment provider.

14 Claims, 6 Drawing Sheets

EXEMPLARY PSS SYSTEM RECONCILIATION REPORT

| Description | Transaction Gross | AFPP Fees | Transaction Net | Transaction Count |
|---|---|---|---|---|
| Summary Number: 987-0354-2015-06-06-USD | | | | |
| Debits | 374633.17 | -6561.22 | 368071.95 | 933 |
| Credits | -9285.05 | 162.45 | -9122.6 | 30 |
| Total Acquired Transactions | 365348.12 | -6398.77 | 358949.35 | 963 |
| Chargebacks | -340.1 | 0 | -340.1 | 1 |
| Previously Pending | 0 | 0 | 0 | 0 |
| Total transfer to Merchant | 365008.02 | -6398.77 | 358609.25 | 964 |
| Pending Transactions | -188.2 | | | 1 |
| Non-settled Reversals | 0 | | | 0 |

FIG. 3

BATCH PROCESSING COMPOSITION AND CONVERSION

CROSS-REFERENCE TO RELATED APPLICATION

This application claims benefit under 35 U.S.C. § 120 and is a continuation of U.S. patent application Ser. No. 14/810,250, filed Jul. 27, 2017, now allowed U.S. Pat. No. 10,977,742, and entitled Batch Processing Composition and Conversion.

BACKGROUND

Batch processing of transactions using alternative forms of payment is described and taught. More specifically, systems, processes and articles of manufacture that serve to improve systems or processes by setting or confirming relationships between cumulative transaction totals for a calibrated period or individual transactions comprising those cumulative transaction totals or both, are described and taught herein.

Payment can be made for goods and services using various monetary means. These can include cash, debit cards, merchant sponsored credit cards, bank sponsored credit cards, and alternative forms of payment, such as: Paypal®; BitCoin; and Alipay. Each of these methods of payment may set their own rules, procedures, calendars, and syntax for linking individual sales to received customer payments. Accordingly, an entity accepting payment is obliged to conform its systems and practices to comply with the rules, procedures, calendars, and syntax of methods of payment it selects to accept. When seven methods of payment are accepted, for example, it is feasible that an entity determine and accommodate dozens of different sets of rules, procedures, calendar, and syntax for processing payments in order to offer each individual payment method to its customers. This accommodation adds complexity to computing systems, increases the burden of maintaining these systems, and adds additional processing and resource requirements for these associated computing systems.

BRIEF SUMMARY

Embodiments include devices, articles of manufacture, and processes. In embodiments a batch process or processor may be provided or employed to compose and/or convert batch files for merchants that allow the merchant to use existing syntax and procedures to accept nontraditional transactions for goods and services where customers intend to tender payment using Alternative Form(s) of Payment ("AFP"). Simplification of merchant systems as well as improved processing speed, reduction in maintenance internals, reduction in revision complexity and timings, and improved accuracy in processing may each be changes realized by merchant(s) systems communicating with systems described herein or employing batch methods described herein or both.

Batch processing of embodiments may be configured such that a grouping of transactions for a period of time can be aggregated and conformed with an applicable merchant's communication syntax and system configurations. The batch processing may comprise batching transactions and converting or modifying or otherwise flagging transactions within a batch as well as making conversions, modifications, or flagging a batch as a whole. These created or subsequently manipulated transactions and batches, may be received by the merchant(s) system and used by that system to correlate aggregate transaction totals with specific individual transactions made by the merchant(s) in its system or elsewhere. In embodiments, the batching and conversion by partner support service servers may be employed to allow merchant systems to accept payment for alternate forms of payment with little or modification from its communication syntax and system configurations used for traditional forms of payment such as credit and debit cards. In so doing, in embodiments, merchant computing systems may be simplified by requiring fewer adjustments and modifications to make sales accepting alternate forms of payment. In other words, through embodiments, a merchant may benefit from not having to make large adjustments to its systems in order to accept AFP in addition to the numerous other forms of payment that the merchant(s) systems may have already been configured to process and accept. As noted, this reduction in complexity can serve to reduce ongoing maintenance of merchant(s) systems, use existing configurations of merchant(s) systems with little or no additional modification, and provide more efficient processing of transactions through the reduction or elimination of processing associated with grouping linked transaction or identifying individual transactions from cumulative batched submissions from an Alternate Form of Payment Provider ("AFPP") or other third-party entity.

In embodiments, a Partner Settlement Service ("PSS") alone, or in conjunction with a Transaction Accumulator ("TA"), serve to batch transactions of a merchant, communicate with and between one or more Alternate Form of Payment Providers, and convert batches of transactions to be received and understood by a merchant system such that the merchant system(s) can reconcile aggregate transaction totals with specific individual transactions made by the merchant. The PSS alone or in conjunction with the TA may, through correlation, provide that the merchant system(s) can carry out transactions with AFP methods, syntax, or other AFP unique attributes without having to fully reconfigure its own internal configurations, internal processing flow, and internal or external communication syntax to comply with and correspond to the systems and communication syntax of AFPPs.

In embodiments the PSS and TA may also provide for calendaring adjustment such that time periods (12 hours, 24 hours, 36 hours, 2 days, 7 days, etc.) for transactions may be set by the merchant system, and communications or processing, which may act with the transactions for purposes of reconciling transactions or for other purposes, may conform with the time periods set by the merchant. In other words, the PSS and TA individually or in combination may reconcile transactions from third-parties, including AFPs that operate around the world, in different time zones or with different system transaction stamping identifiers, such that a universal date adjustment or identifier for each transaction is generated and assigned in order to accommodate a time period, such as a 24 hour period, or time stamp or both, as has been set by the merchant system. In certain embodiments, this time period adjustment to accommodate the merchant calendaring reference can accommodate different amounts of time as well. In other words, if AFPPs are using 12 hour periods and a merchant is using 24 or 48 hour periods, the PSS or TA or both may reconcile this discrepancy such that the merchant system would need not change its calendaring reference methodology in order to link transactions or otherwise process batch payments for payments made using AFPPs or other methodologies. Thus, twelve-hour time stamps from an AFP may be correlated with a single 24 hour calendaring period set by a merchant system.

Still further, because of these or other batching techniques, in embodiments a merchant system may be able to accept AFP through third-party sales channels while remaining the merchant of record and reconciling the additional transactions corresponding to the merchant's total AFP sales. Maintaining merchant of record status and reconciling the additional transactions may be accomplished in embodiments with little or no adjustment of a merchant's computer system already configured to accept payment from and transact with debit cards, merchant sponsored credit cards, bank sponsored credit cards, etc.

Accordingly, batch aggregation or other features of embodiments may allow a merchant computing system to accept alternative forms of payment (AFP) without having to make one-time accommodations or a series of future accommodations to comply with rules and syntax of AFPPs. Thus, through the batch processing and aggregation, which may include universal numbering and fluctuating calendaring reconciliation, a PSS, working with a TA, may serve to limit the number of adjustments a merchant system, that accepts traditional forms of payment such as bank credit cards, and bank debit cards, to also accept AFPs with little or no change to the merchant payment receipt systems and opportunities for improved system performance.

BRIEF DESCRIPTION OF THE SEVERAL VIEWS OF THE DRAWINGS

FIG. 3 shows an exemplary Partner Settlement Service Report as may be employed to process batches of aggregate transactions to be received and understood by a merchant computer system in embodiments.

DETAILED DESCRIPTION

Figure 1:
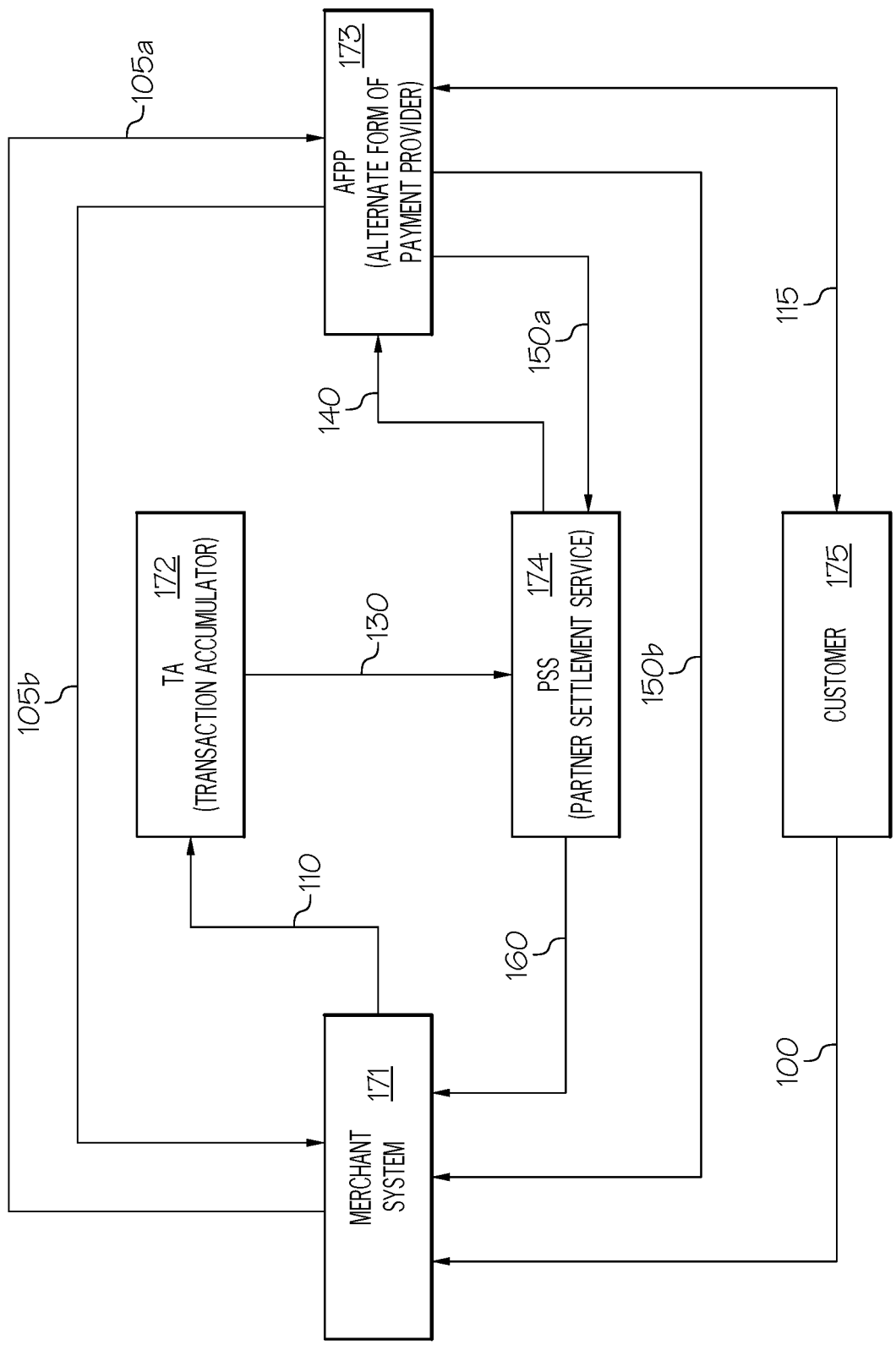
FIG. 1 shows a schematic overview of systems and communication paths as may be employed in embodiments.

Embodiments include devices, articles of manufacture and processes. In embodiments a batch process or processor may be provided or employed to compose and/or convert batch files for merchant systems that allow the merchant computing systems to use existing syntax and procedures to accept nontraditional transactions for goods and services where customers intend to tender payment using Alternative Forms of Payment. The batch processing may be configured such that a period of applicable time can be set by or conform with an applicable merchant's system instructions or an AFPP's instructions. The batch processing may compose batches of transactions and subsequently convert or modify or flag transactions within the batch or the batch as a whole. After being generated, this created and/or subsequently manipulated batch may be received by the merchant computer system and used to correlate aggregate transaction totals with specific individual transactions made by the merchant, such as sales, returns, refunds, insufficient payments, etc., with payment identified to be associated with an AFPP for the transaction.

In embodiments a Transaction Support Provider (TSP) can provide and maintain a Transaction Accumulator ("TA") as well as a Partner Settlement Service or Server ("PSS"). Through the use of the TA or PSS or both, merchant computer system integration, support, versatility and reconciliation may be enhanced as when compared without the use of each and both the TA and PSS. In operation the PSS can serve to simplify integration of several API calls in the beginning of a transaction, after which the transaction may be treated as a TSP charge card transaction. Other operational services can include having the PSS react to changes in syntax and communication requirements rather than having the merchant computing system accommodate individual permutations or global adaptations. In certain instances these accommodations and adaptations can include those imposed by Alternate Forms of Payment Providers and in so doing the merchant may be able to reduce the amount of maintenance and upkeep of a merchant's or AFPP's transaction systems.

Use of the TA and the PSS may also promote simplified and customized reconciliation of an entire period of time's transactions, including sales, refunds, changes, and insufficient funds transactions, by a merchant computing system through the use of PSS batching techniques and related reporting. In embodiments, a merchant computing system may be able to reconcile an entire day of sales in a single line item based on the merchant's single day total for a certain AFPP. Thus, embodiments employing the batching and reporting techniques can promote avoidance of individual reconciliation of AFP transactions at a merchant computing system, and reconciliation over a date range set by the AFPP rather than the merchant.

In embodiments, merchant or AFPP computing systems may use their own reconciliation periods rather than those set by an AFPP or the merchant (as applicable). In other words, through the use of batch processing, a processing date set by the merchant computing system or the AFPP computing system for an entire transaction, which conflicts with a processing date set by the AFPP or the merchant, may nonetheless be used because of the batching and syntax techniques described herein. Similarly, refund matching may also be impacted by embodiments where batch processing may cycle through incongruent AFPP reports to identify matching transactions and refunds using key search identifiers.

For purposes of refund matching or processing date synchronization or for other purposes as well, a master identifier may be generated and set by the PSS for each transaction received from the TA. This master identifier is in addition to the various other identifiers that already exist in the transaction. The master identifier is a unique identifier that is not reused. In so doing, this master identifier may be used for searching, batching, pairing, and for other purposes as well by the PSS, merchant(s) computing system, or by other systems as well. For purposes of date reconciliation, a standard universal processing date methodology may also be consistently used to provide correlation by the PSS and the merchant computing system for inconsistent transaction dating methodologies between the merchant computing system and one or more of the AFPPs. In either instance, in embodiments, serial processing searching for matches may be reduced or eliminated through the use of the unique identifier and the calendaring calibration.

Through the use of the PSS or the TA or both a merchant may minimize the amount of its initial computer system adjustments and its subsequent computer system revisions associated with interacting with one or more AFPPs or other unique third-party payment vendors. In addition, the batching techniques, including the use of the master identifier and the calendaring calibration, may provide processes whereby pluralities of transactions may be reconciled automatically with little or no additional unique system adjustments being made by the merchant for purposes of the reconciliation. Still further, large aggregates of transactions, which can include sales, refunds, itinerary changes, seat changes, partial payments, among other things, may be reconciled by the PSS and linked to a single aggregate payment made by the AFPP to the merchant. The merchant computer system may be advised of the specific transactions associated with the aggregate AFPP payment via a batch report prepared and sent consistent with embodiments herein.

In some embodiments the merchant computer system may itself use a third-party proxy for purposes of making sales, making adjustments, and other related transactions with customers. For example, if the merchant is an airline the third party proxy may be a travel agent or travel website. When third party proxies are involved, the TA and PSS may gather transaction information from them as well and provide batching, unique identifier, and calendar calibration services for the merchant computing system, here too, minimizing the degree of initial system adjustment and ongoing maintenance needed to transact on these additional third-party proxy platforms.

FIG. 1 shows a schematic of actors as may be employed in batch processing systems in accord with embodiments. Labeled in FIG. 1 are the merchant computing system 171, the Transaction Accumulator (TA) computing system 172, the Alternate Form of Payment Provider (AFPP) computing system 173, the Partner Settlement Service (PSS) computing system 174, and the Customer device 175 (e.g., telephone, thin-client, other computing device). Various exchanges between these actors are labeled 100, 105a, 105b, 110, 115, 120, 130, 140, 150a, 150b, and 160 and are explained in more detail in FIG. 2.

In embodiments, a customer makes a purchase from a merchant and pays for the purchase using a form of electronic payment. A Transaction Support Provider (TSP), which offers transaction support to one or more merchants, can provide assistance to a merchant computing system to reconcile funds received many days later, from a payment service, with the customer purchase. A benefit offered by the TSP, through the use of its TA and PSS, may enable the merchant to avoid conforming its systems and processes to numerous AFPPs, which can each have their own communication syntax, transaction reporting demands, and calendaring naming methodologies. When transactions are carried out by or on behalf of the merchant, through a merchant proxy for example, the TA or PSS can assign a universal transaction number that may follow that transaction for its entire lifecycle. This transaction number may be unique and never used again. The TA or PSS may also assign a conversion to the transaction date in order to conform the transaction date to a reference period of time or a reference standard.

The universal transaction number may be used at various times by the TA and PSS and may be assigned regardless of other numbers assigned by any of the entities, including the merchant and the AFPP. The universal transaction number may be used to aggregate transactions related to the same purchase that occur at the same time or at different times. For example, when air travel tickets are purchased, the purchase can be for multiple passengers and can also involve seat selection. Later on, an itinerary change may occur and in either scenario the merchant computing system and the customer and the AFPP computing system may not be viewing the purchase from the same time perspective. Because of all of these variables, the PSS or the TA may assign a universal transaction number for each action and then aggregate universal transaction numbers to account for all activities related to the purchase and subsequent adjustments. Later on the universal transaction number may also be used for billing purposes and to link lump sum payments made by the AFPP to the merchant computing system to specific purchases received at the merchant computing system.

The PSS and TA may also assign calendaring adjustments and/or universal calendaring assignments, to each of the transactions for purposes of aggregating related actions to the same transaction or series of transactions. Likewise, the PSS and TA may also accept calendaring rules set by others and accommodate those when aggregating transaction and series of transactions. These calendaring adjustments can serve to calibrate an AFPP's assigned transaction date to a universal reference time period. In embodiments, this reference time period may be for a certain twenty-four hour period as well as for other ranges of time as well, e.g., twelve hours, forty-eight hours, seventy two hours, etc. This reference time period may be used by the PSS to sync batched jobs and for purposes of identifying how and which transactions should be batched together.

Figure 2:
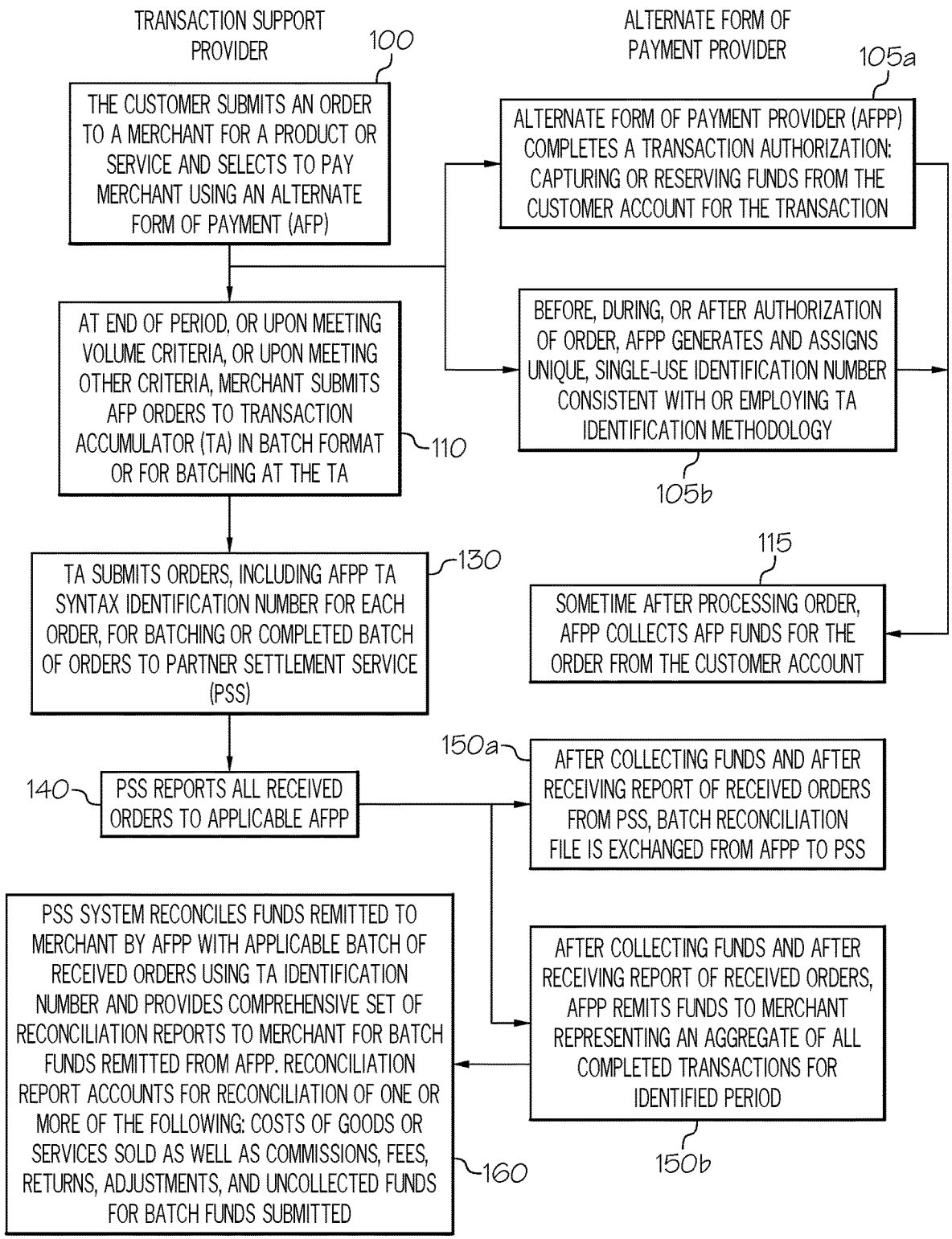
FIG. 2 shows processes as may be employed by the systems of FIG. 1 as well as in other embodiments.

FIG. 2 shows the various processes that may be carried out by and between the actors and computing systems of FIG. 1 as well as in other embodiments of the invention. As shown at 100, a customer may submit an order to a merchant for a product or service and select to pay the merchant using an Alternate Form of Payment (AFP). Then, as shown at 105a, Alternate Form of Payment Provider (AFPP) may complete a transaction authorization: capturing or reserving funds from the customer account for the transaction. Before, during, or after authorization of the order, the AFPP or PSS generates and assigns unique, single-use identification number consistent with or employing TA identification methodology, which is shown at 105b. At the end of a relevant time period, or upon meeting volume criteria, or upon meeting other criteria, the merchant may submit AFP orders to the Transaction Accumulator (TA) in batch format or for batching at the TA as shown at 110. Sometime after processing the order, AFPP collects AFP funds for the order from the customer account, as shown at 115. Subsequent to this, the TA may submit orders, including AFPP TA syntax identification number for each order, for batching or completed batch of orders to the Partner Settlement Service (PSS), as shown at 130.

Once the batching has been undertaken, the PSS can report all received orders to applicable AFPPs, see 140, and after collecting funds and after receiving report of received orders from PSS, batch reconciliation file is exchanged from AFPP to PSS, see 150a. Near the end of the process, after collecting funds and after receiving report of received orders, AFPP may remit funds to the merchant computing system where the funds represent an aggregate of all completed transactions for the identified period, as shown at 150b. Finally, as shown at 160, PSS system may reconcile the funds remitted to merchant by AFPP with applicable batch of received orders using TA identification number and may provide a comprehensive set of reconciliation reports to merchant system for batch funds remitted from AFPP. Reconciliation reports can account for reconciliation of one or more of the following: costs of goods or services sold as well as commissions, fees, returns, adjustments, and uncollected funds for batch funds submitted.

FIG. 3 shows a table as may be constructed by the PSS and transmitted to the merchant system for batch processing funds received on behalf of an AFPP. The reconciliation report 300 includes: columns 381 providing a description of the tabular data below; column 382 describing transaction gross of the tabular information; 383 showing AFPP fees, representative of fees deducted from 382 by the AFPP for services performed; Transaction Net 384, which represents the net proceeds of a certain transaction; and a transaction counter 385 to identify how many underlying transactions are represented by a tabular row of information. Descriptions 386 and 387 and 388 are each indicative of aggregate dollar value for that description.

Figure 4:
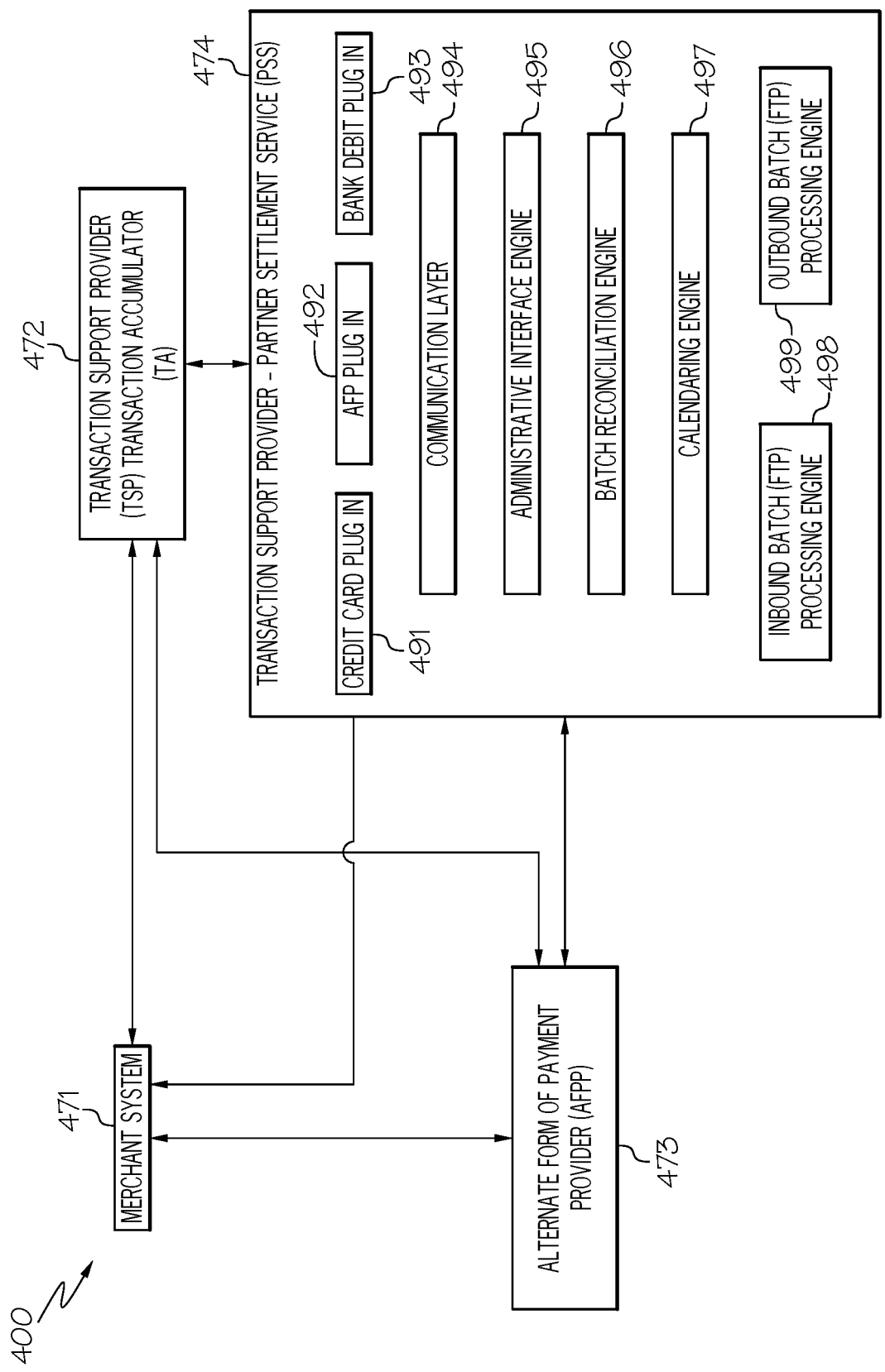
FIG. 4 shows an exemplary configuration of a Partner Settlement Service and communication paths by and between the PSS, merchant computing system, and other components of a batch processing and conversion system in accord with embodiments.

FIG. 4 shows schematic details of a batch processing and conversion system 400 as may be employed in embodiments. Labeled in FIG. 4 are merchant computing system 471, Transaction Support Provider (TSP) Transaction Accumulator (TA) system 472, Transaction Support Provider (TSP) Partner Settlement Service (PSS) system server 474, and Alternate Form of Payment Provider (AFPP) system 473. As can be seen there are various communication paths indicated between them, with the merchant computing system 471 shown having two-way communications with the AFPP 473 and the TA 472 as well as receiving one-way communications from the PSS 474. The Transaction Accumulator 472 is shown having two-way communications with the merchant system 471, the AFPP 473 and the PSS 474. Likewise the AFPP 473 is shown having two-way communications with the merchant system 471, the TA 472, and the PSS 474. The PSS is shown being able to send communications to the merchant system 471 and having two way communications with the TA 472 and the AFPP 473. In other embodiments the communication flows may be different, for example, the merchant system may have two communications with the PSS. These communications between the merchant, TA, AFPP, and PSS may be carried out in various ways, including through private secured networks using various tunneling protocols such as IPsec, SSL/TLS, DTLS, MPPE, SSTP, and OpenSSH. The communications may also be secured using various encryption technologies employing public key technologies or otherwise. Examples of the encryption techniques that may be employed for the communications include SHTTP, PPTP, and L2TP.

The PSS, which is shown as a server 474 in FIG. 4, may be resident in a single server as well as being provided in duplicate servers for redundancy, and across multiple servers for duplication or workload overflow or for other reasons as well. While several components of the PSS are shown at 474 of FIG. 4, PSS embodiments may include more or fewer of these components as well in. Labeled in the PSS of FIG. 4 are credit card plug in 491, Alternate Form of Payment ("AFP") plug in 492, bank debt plug in 493, communication layer 494, administrative interface engine 495, batch reconciliation engine 496, calendaring engine 497, inbound batch processing engine 498, and outbound batch processing engine 499.

The credit card, AFP, and bank debit plug-ins 491-493 may provide conversion syntax and conversion requirements as well as other conversion services for a particular payment provider. In other words, a PSS may load a plug-in configured to allow the PSS to receive conversion syntax and requirements for a particular bank debit card, or a particular credit card or a specific form of payment or a specific AFPP. Thus, as additional conversion services are offered to and maintained by the PSS for a merchant, such as merchant 471, the PSS may update and maintain itself by adding or updating or removing plug-ins for the various payment conversion services provided to the merchant by the PSS. Still further, the PSS may be serving several merchants and may have different plug-ins for each of these merchants. Thus, a specific AFPP may have several plug-ins at the PSS, where each plug-in for the AFPP is for a different merchant of various groups of merchants.

The communication layer 494 may provide communication services for the PSS, providing necessary protocol layer support for communications outside of the PSS. This layer 494 may allow for FTP file transfers for the batch processing engines 498 and 499 as well as for interfacing remote thin clients for purposes of adjusting the administrative interface engine 495. The communication layer may support the various listed communication strategies and protocols listed above.

The administrative interface engine 495 may allow for direct or remote administrative monitoring and control of the PSS. The administrative monitoring may provide for manual control and monitoring of the PSS as well as automatic monitoring and control of the PSS. The administrative engine may generate reports and alerts informative of the operation or efficiency or both of the PSS.

The batch reconciliation engine 496 may provide various services and processes. These include PSS transaction batching, PSS processing of response files from the AFPPs, and PSS settlement reconciliation and reconciliation reporting. The PSS transaction batching may include, in conjunction with the inbound batch processing engine 498, extracting daily AFPP transactions from the TA and storing them in the PSS for further processing. The PSS transaction batching may also include processing sales, and processing refunds. The processing sales may include writing to daily transaction as well as history tables using information from the TA, decrypting credit card numbers, and formatting daily sales records according to the specification submission identified by the applicable plug-in or otherwise specified by the AFPP for submission to the applicable AFPP. The batching engine may also generate and assign a universal transaction number for each transaction where this unique identifier may be used throughout the lifecycle of the transaction, may not be used again, and be above and beyond identifiers assigned by the merchant, bank, AFPP, and TA, in order to promote consistent and repeated reference to the transaction.

Processing refunds by the engine 495 may include finding and flagging same day refunds and matching debits in the PSS database to exclude them from batching. Processing refunds may also include processing remaining funds, matching them with previous sales that were successfully completed by the AFPP. In service embodiments, such as air travel, the refund matching may be based first on ticket number, then on ticket number without check digit, then on card number and amount, then on card number and passenger name. If a refund is successfully matched to a sale using this refund matching, the engine 495 may write to a daily transactions and history table. If a refund is not successfully matched to a sale, the engine 495 may write to a daily aged credits table to hold for future sales and may also flag the refund in the PSS database as not submitted. From time to time the reconciliation engine 496 may flag submitted transaction in the PSS database as indicators of processed, submitted, or otherwise handled individual transactions or batches of transactions.

The reconciliation engine 496 may also provide services for the PSS to process received response files from the AFPPs. These services may involve the use of the engine 498 to download daily response files from an AFPP FTP site. These services may also include importing response files into a staging table for processing in order to standardize data types in the PSS database, and to eliminate header and footer records. Records may also be matched from the numerous response files, to the transactions in the PSS database based on processing date, ticket number, and/or card number and amount. Rejected transactions may be flagged during this process by recording an error code in the transaction ID column of the applicable PSS database. A rejection history table may also be populated. Comparatively, successful transactions may be flagged by recording an AFPP assigned transaction ID in the applicable PSS database. An exception report may then be generated by the reconciliation engine 496 and then output by the processing engine 499 for purposes of documenting and reporting all transactions rejected by the AFPP 473.

Settlement, reconciliation, and reporting may be carried out by the engine 496 by itself or in conjunction with other components of the PSS 474. The engine 496 may work with the processing engine 498 to extract daily transaction for payments from the data warehouse into the PSS 474 database. Daily settlement files downloaded by the processing engine 498 and previously imported into a settlement staging table may be matched periodically, e.g., daily, with transactions in the PSS 474 database based on identifiers such as ticket number and merchant ID. Matched transactions may then be flagged in the PSS database with a settlement ID from the settlement staging table while unmatched transactions may be moved to the pending table to make them available for later matching.

The calendaring engine 497 may serve to identify periods of time set by one or more of the plug-ins 491-493 and to identify a universal calendaring period that may be used reconcile inconsistent calendaring periods from the various plug ins and/or from the merchant. For example, if time zone conflicts or other time discrepancies arise between the various AFPPs and the merchant(s), the calendaring engine can serve to set a universal calendaring period such that transaction may be seen from this standard time setting or adjusted to a correlated time period. A standard reconciliation to a universal time may be used to compare transaction and match related ones. Moreover, the time period may be set to various groupings of time, such as universal days of twenty four hours, universal weeks of seven days, universal months, and universal years. Through the use of this universal calendaring by the engine 497, related or identical transactions, which would be difficult or impossible to link to each other because of different transaction dates identified by the merchant(s) and the AFPPs or banks, can nonetheless be reconciled by the engine 496 because the disparity in dates has been trued to a universal reference point by the calendaring engine 497. For example a purchase charge and discount issued at the same time for the same sale may be linked to different dates by the merchant system and bank system or AAPP. The calendaring engine can square this discrepancy and allow the batch engine 496 to link and process the purchase charge and discount for subsequent batch processing and reporting to the merchant system.

The inbound batch processing engine 498 may serve to perform certain batching operations in addition to or in conjunction with those otherwise identified herein. These operations may include performing looping logic to batch transactions by merchant and currency, with associated itinerary, tax, and expanded data records into batch files according to the transaction number limits and other specifications of the AFPP, merchant or a specific plug-in. These specifications can include batch, invoice and file headers and footers. In addition, sequence numbers may be used by the batch engine 498 to make file names unique when multiple batch files are generated for the same day or period of time.

The outbound batch processing engine 499 may serve to upload batched transaction files to the AFP website for processing. The engine 499 may also upload batched transaction files to other recipients, such as the merchant(s) 471. For purposes of settlement and reconciliation and reporting the processing engine 499 may serve to create and export various PSS reports and records. This processing may include looping through transactions by merchant or previously processed by the reconciliation engine 496 and may also include compressing these reports and/or records for efficient transport and sharing the reports in the PSS for validation. The compiled and exported reports may contain all matched transactions, matched sales, matched refunds, refunds that were previously pending but are now matched, daily transactions that have no match in the settlement file, records from the settlement file that have no match in the PSS database, and a summary report of these transmitted reports and records. This batching and reporting may be conducted on a merchant by merchant basis and may be batched periodically, including hourly, daily, and monthly.

Merchant system 471 may have enhanced processing through use of one or more of the above techniques or methods. These enhancements may be derived from reduced or eliminated processing steps at the merchant system as well as reduced or eliminated maintenance of the system associated with accommodating payment receipts using an AFP. Thus, through embodiments, a merchant system 471 may execute its processes more quickly and the resources attributable to maintaining the system 471 may be reduced through lower ongoing maintenance or reconfigurations.

Figure 5:
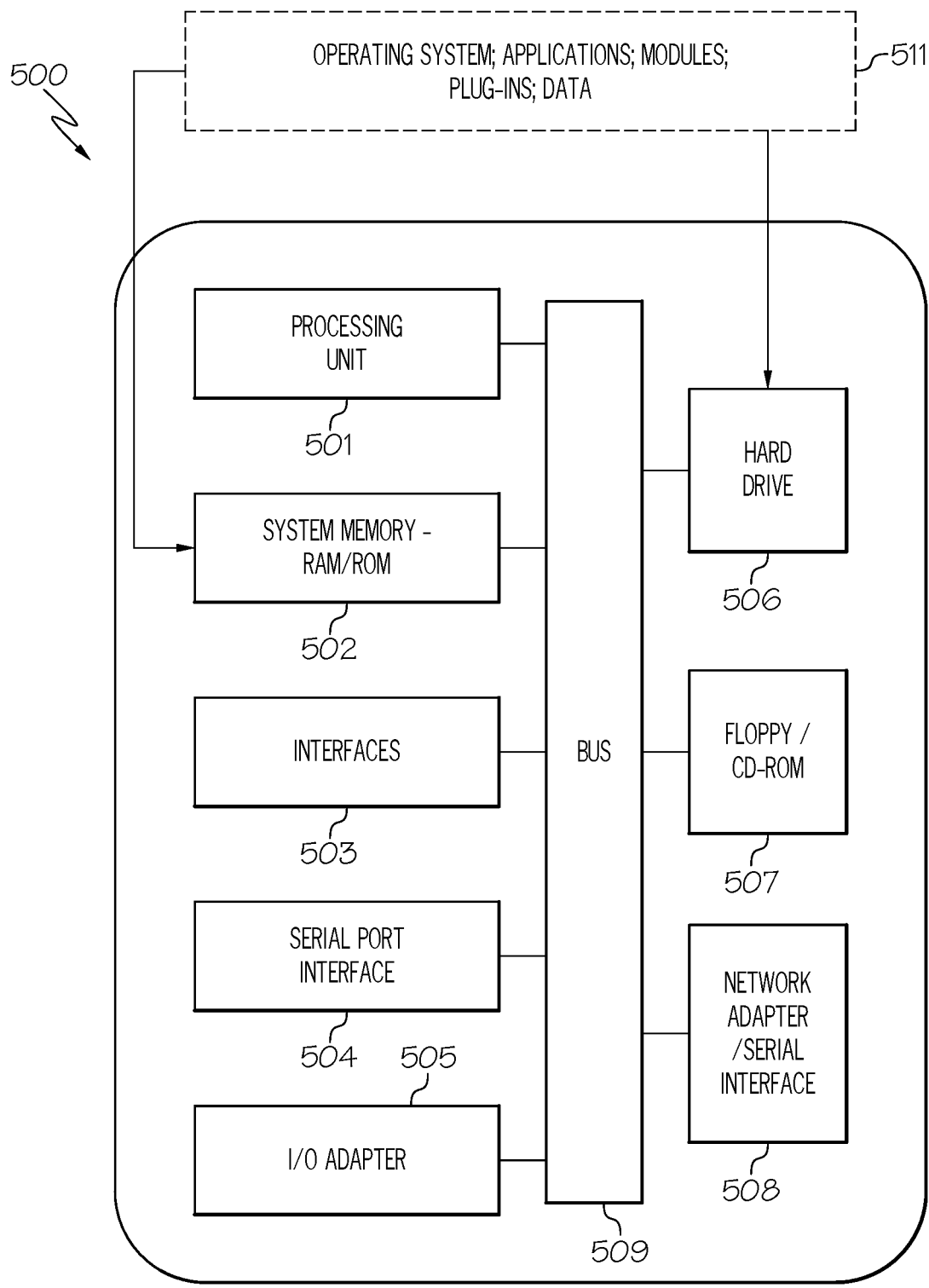
FIG. 5 shows exemplary internal components as may be employed by the Partner Settlement Service, the Transaction Accumulator, the Alternate Form of Payment Provider, and the merchant computing system of embodiments.

FIG. 5 shows a schematic diagram of a merchant system, a TSP, a TA or an AFPP as each may be employed in embodiments. The various features and techniques described throughout, for each of the merchant, TSP, TA, and AFPP, may be implemented for each of them in a separate server/system like that shown in FIG. 5. Labeled in FIG. 5 are: a server/system 500 with internal components comprising processing unit 501, system memory RAM/ROM 502, interfaces 503, serial port interface 504, I/O adapter 505, hard drive 506, optical drive 507, and network adapter/serial interface 508. Each of these components may communicate by and between themselves via the bus 509. Operating systems, applications, modules, plug-ins and data may be stored in memory 502 and/or hard drive 506 and may cause the server/system 500 to carry out the processes described herein. The hard drive 506 and memory 502 may be used for other purposes as well, including storing the databases and records associated with the TSP or the TA and used by the engines comprising their functionality. The batch engines 498 and 499 may communicate through the adapter 508 as well as the interface 503 and the adapter 505. The batch reconciliation engine 496, like the other engines may be carried out by instructions loaded from the hard drive 506 into processor 501. These instructions may be loaded upon start up or at other times as well. A virtual environment may also be running on processor 501, where this virtual environment may run some or all of the functionality of the engines 495, 496, and 497.

Figure 6:
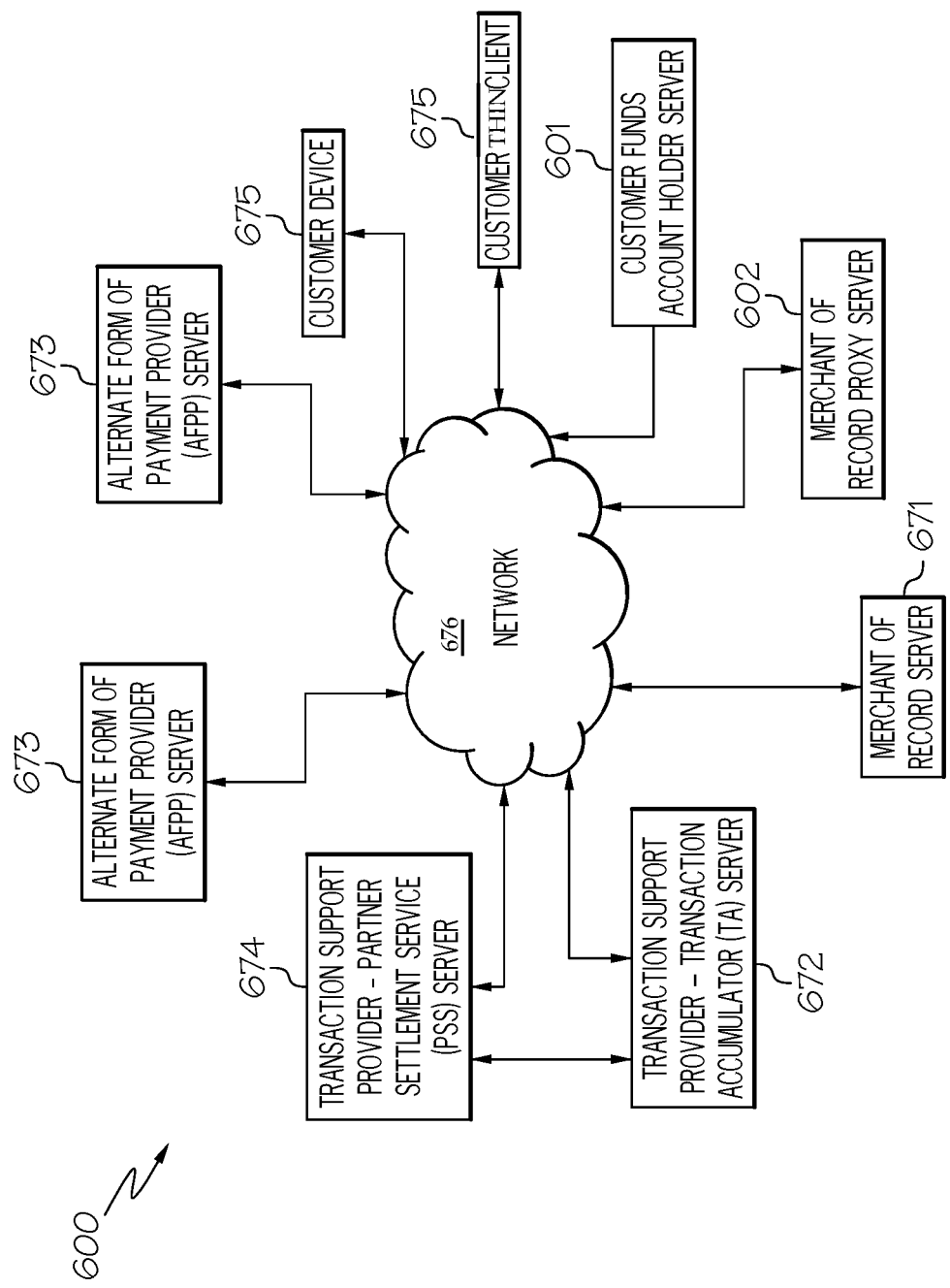
FIG. 6 shows a schematic of how components may communicate by and between themselves, through a network, in embodiments.

FIG. 6 shows an overview of how computer systems involved in a transaction may communicate with one another through the network 676 or directly to one another, as shown by the link between PSS 674 and TA 672. Labeled in FIG. 6 are Alternate Form of Payment Providers (AFPPs) server 673, Transaction Support Provider—Partner Settlement Service (PSS) server 674, Transaction Support Provider—Transaction Accumulator (TA) server 672, Merchant of Record server 671, Merchant of Record Proxy server 602, Customer Funds Account Holder system 601, and Customers 675. In operation a customer may wish to buy services or goods from the merchant of record and may do so by directly interacting with the merchant of record or a proxy of the merchant of record. For example, when airline tickets are to be purchased, the customer may interact with the airline directly or with a travel service that itself deals with the airline. The customer ticket purchase can include multiple tickets for travelers, seat selections, and perhaps a change of itinerary after the tickets are originally purchased. The customers 675 can carry these operations out by communicating with the merchant 671 or merchant proxy 602 with the PSS and TA serving to aggregate and bundle transactions in order to correlate them with payments made to the merchant by account holder 601 and AFPP. These communications may be made via the network 676 using various communication protocols identified above. FIG. 6 shows how each of the actors involved in the transaction may communicate over WAN or the Internet as well as communicate using private networks in the case of the PSS and TA.

The language of the application including the figures is used to describe examples of the invention and should not be considered to limit the invention to the specific combinations provided. Accordingly, the teachings of the application go beyond the specific figures and applicable text provided herein. When reading the application, "a," "an" and "the" should be understood as including plural forms as well, unless the context clearly indicates otherwise. Numerous other configurations are possible, including combinations of the embodiments provided herein, with more or fewer features and features further mixed among or between embodiments.

What is claimed is:

1. A computing system comprising:
 a processing unit electrically coupled to system memory, the system memory storing instructions to be run by the processing unit, the instructions, when run, cause the processing unit to:
  send a batch reconciliation report to a merchant computing system, the batch reconciliation report linking a lump sum payment of an Alternate Form of Payment Provider (AFPP) to pay a merchant with a plurality of specific merchant transactions from previously matched settlement data;
  wherein, after receipt by the merchant computing system, the batch reconciliation report is used to reconcile individual transactions from direct customers of the merchant who used Alternate Forms of Payment of Alternate Forms of Payment Providers, and
  wherein the merchant computing system is configured to accept payment transactions from a credit card company but not from an AFPP.

2. The computing system of claim 1 wherein the merchant computing system is configured to accept payment transactions from multiple credit card companies but not from an AFPP.

3. The computing system of claim 1 wherein the AFPP is not a credit card issuer or acquirer.

4. The computing system of claim 1 wherein the batch reconciliation report is representative of initial sales records and subsequent modifications of the initial sales records.

5. The computing system of claim 1 wherein the merchant computing system is configured to operate a single-use identification code methodology to process credit card sales made by direct customers of the merchant.

6. The computing system of claim 5 wherein the single-use identification code methodology includes use of a single-use code that is unique when compared to all earlier single-use codes of the merchant transaction server.

7. A batch process for reconciling merchant sales transactions with simplified merchant transaction server configuration, the process comprising:
 at a first computing system, matching settlement data from a batch report received from an Alternate Form of Payment Provider (AFPP) with previously received customer transactions associated with the AFPP;
 at the first computing system, generating a batch reconciliation report to link a lump sum payment made by the AFPP to pay a merchant, the batch reconciliation report comprising individual previously received customer transactions matched from the settlement data; and
 sending the batch reconciliation report from the first computing system and received by a merchant transaction server,
 wherein generating the batch reconciliation report comprises the first computing system converting transactions within batch, the conversion enabling the merchant transaction server to accept payment from one of more Alternate Forms of Payment (AFP) via the AFPP through the use of the merchant transaction server's existing single-use identification code methodology, the code methodology as otherwise used by the merchant transaction server when processing credit card sales made by direct customers of the merchant,
 wherein, using the received batch reconciliation report, the merchant transaction server reconciles the customer transactions of customers using one or more Alternative Forms of Payment (AFP) via the AFPP through the use of the merchant transaction server's existing single-use identification code methodology, the code methodology as otherwise used by the merchant transaction server when processing credit card sales made by direct customers of the merchant.

8. The batch process of claim 7 further comprising:
 receiving a batch report from the AFPP, this batch report including settlement data for transactions carried out by the AFPP and regarding services or goods sold by the merchant and paid by customers of the merchant using AFP as payment.

9. The batch process of claim 7 wherein the AFPP operates to collect funds for the individual previously received customer transactions from individual accounts of the customers of the merchant, the AFPP operating to remit funds to the merchant as payment for services or goods sold using the AFP as payment by customers of the merchant, and wherein the AFP is an alternative to credit-card payment.

10. The batch process of claim 7 further comprising:
 receiving at a Partner Settlement Service (PSS), from a Transaction Accumulator (TA), a plurality of transactions from customers of a merchant for services or goods sold using AFP via the AFPP, as payment to the merchant for the services or goods sold; and sending a batch report of all transactions associated with a specified AFPP taken from the plurality of transactions received at the Partner Settlement Service (PSS) from the TA.

11. A batch process for reconciling merchant sales transactions with simplified merchant transaction server configuration, the process comprising:

at a first computing system, generating a batch reconciliation report to link a lump sum payment made by an Alternate Form of Payment Provider (AFPP) to pay a merchant, the batch reconciliation report comprising individual previously received customer transactions matched from settlement data associated with customer purchases of goods or services from the merchant, the purchases made by the customers using at least one Alternate Form of Payment (AFP); and sending the batch reconciliation report to a merchant transaction server, wherein generating the batch reconciliation report comprises at the first computing system converting transactions within batch, the conversion enabling the merchant transaction server to accept payment from one of more Alternate Forms of Payment (AFP) via the AFPP through the use of the merchant transaction server's existing single-use identification code methodology, the code methodology as otherwise used by the merchant transaction server when processing credit card sales made by direct customers of the merchant, wherein, using the received batch reconciliation report, the merchant transaction server reconciles the customer transactions of customers using at least one AFP via the AFPP through the use of the merchant transaction server's existing single-use identification code methodology, the code methodology as otherwise used by the merchant transaction server when processing credit card sales made by direct customers of the merchant, and wherein the AFP is an alternative to credit-card payment.

12. The batch process of claim 11 further comprising:

receiving a batch report from the AFPP, this batch report including settlement data for transactions carried out by the AFPP and regarding services or goods sold by the merchant and paid by customers of the merchant using AFP as payment.

13. The batch process of claim 11 further comprising:

receiving at a Partner Settlement Service (PSS), from a Transaction Accumulator (TA), a plurality of transactions from customers of a merchant for services or goods sold using AFP via the AFPP, as payment to the merchant for the services or goods sold; and sending a batch report of all transactions associated with a specified AFPP taken from the plurality of transactions received at the Partner Settlement Service (PSS) from the TA.

14. The batch process of claim 13 further comprising:

at the PSS, matching settlement data from a batch report received from the AFPP with previously received customer transactions associated with the AFPP.

\* \* \* \* \*